(12) United States Patent
Sloane et al.

(10) Patent No.: US 8,745,969 B2
(45) Date of Patent: Jun. 10, 2014

(54) METHODS FOR ENGINE EXHAUST NOX CONTROL USING NO OXIDATION IN THE ENGINE

(75) Inventors: Thompson M. Sloane, Kewadin, MI (US); Wei Li, Troy, MI (US); David J. Cleary, Shanghai (CN); Kevin L. Perry, Fraser, MI (US); Michael B. Viola, Macomb Township, MI (US); David R. Monroe, Telluride, CO (US)

(73) Assignee: GM Global Technology Operations LLC, Detroit, MI (US)

( * ) Notice: Subject to any disclaimer, the term of this patent is extended or adjusted under 35 U.S.C. 154(b) by 886 days.

(21) Appl. No.: 12/877,162

(22) Filed: Sep. 8, 2010

(65) Prior Publication Data

US 2012/0055138 A1 Mar. 8, 2012

(51) Int. Cl.
    *F01N 3/20* (2006.01)
(52) U.S. Cl.
    USPC .................................. 60/285; 60/295; 60/301
(58) Field of Classification Search
    USPC .............................. 60/285, 295, 301, 303, 286
    See application file for complete search history.

(56) References Cited

U.S. PATENT DOCUMENTS

| 2003/0182933 A1* | 10/2003 | Adelman et al. ............... 60/285 |
| 2009/0277159 A1* | 11/2009 | Driscoll et al. ................ 60/286 |
| 2010/0000202 A1* | 1/2010 | Fisher et al. ................... 60/286 |

OTHER PUBLICATIONS

Hori, Matsunaga, Marinov, Pitz and Westbrook, An Experimental and Kinetic Calculation of the Promoation Effect of Hydrocarbons on the NO—NO2 Conversion in a Flow Reactor, Twenty-Seventh Symposium (International) on Combustion, The Combustion Institute, 1998, Livermore, CA USA.

* cited by examiner

*Primary Examiner* — Kenneth Bomberg
*Assistant Examiner* — Jonathan Matthias

(57) ABSTRACT

A powertrain includes an internal combustion engine having a combustion chamber and an aftertreatment system. A method for reducing NOx emissions in the powertrain includes monitoring an actual exhaust gas feedstream ratio of $NO_2$ to NO, monitoring a desired exhaust gas feedstream ratio of $NO_2$ to NO, comparing the actual and the desired exhaust gas feedstream ratios of $NO_2$ to NO, and selectively initiating a $NO_2$ generation cycle based upon the comparison of the actual and the desired exhaust gas feedstream ratios of $NO_2$ to NO comprising injecting fuel mass into the combustion chamber after a primary combustion event.

21 Claims, 9 Drawing Sheets

METHODS FOR ENGINE EXHAUST NOX CONTROL USING NO OXIDATION IN THE ENGINE

TECHNICAL FIELD

This disclosure is related to control of aftertreatment of NOx emissions in internal combustion engines.

BACKGROUND

The statements in this section merely provide background information related to the present disclosure and may not constitute prior art.

Oxides of nitrogen, NOx, are known by-products of combustion. NOx is created by nitrogen and oxygen molecules present in engine intake air disassociating in the high temperatures of combustion, and rates of NOx creation include known relationships to the combustion process, for example, with higher rates of NOx creation being associated with higher combustion temperatures and longer exposure of air molecules to the higher temperatures.

NOx molecules, once created in the combustion chamber, can be converted back into nitrogen and oxygen molecules in exemplary devices known in the art within the broader category of aftertreatment devices. However, one having ordinary skill in the art will appreciate that aftertreatment devices are largely dependent upon operating conditions, such as device operating temperature driven by exhaust gas flow temperatures and engine air/fuel ratio. Additionally, aftertreatment devices include materials, such as catalyst beds, prone to damage or degradation as a result of use over time and exposure to high temperatures.

Engine control methods may utilize diverse operating strategies to optimize combustion. Some operating strategies optimizing combustion in terms of fuel efficiency include lean, localized, or stratified combustion within the combustion chamber in order to reduce the fuel charge necessary to achieve the work output required of the cylinder and increase engine efficiency, for example, by operating in an unthrottled condition, reducing air intake pumping losses. While temperatures in the combustion chamber can get high enough in pockets of combustion to create significant quantities of NOx, the overall energy output of the combustion chamber, in particular, the heat energy expelled from the engine through the exhaust gas flow, can be greatly reduced from normal values. Such conditions can be challenging to exhaust aftertreatment strategies since aftertreatment devices frequently require an elevated operating temperature driven by the exhaust gas flow temperature to operate adequately to treat NOx emissions.

Aftertreatment devices are known, for instance, utilizing chemical reactions to treat exhaust gas flow. One exemplary device includes a selective catalytic reduction device (SCR). Known uses of an SCR device utilize ammonia derived from urea injection to treat NOx. Ammonia stored on a catalyst bed within the SCR reacts with NOx, preferably in a desired proportion of NO and $NO_2$, and produces favorable reactions to treat the NOx. One exemplary embodiment includes a preferred one to one, $NO_2$ to NO molar proportion, and is known as a fast SCR reaction. It is known to operate a NOx treatment catalyst such as a diesel oxidation catalyst (DOC) upstream of the SCR in diesel applications to convert NO into $NO_2$ for preferable treatment in the SCR. Continued improvement in exhaust aftertreatment requires accurate information regarding NOx emissions in the exhaust gas flow in order to achieve effective NOx reduction, such as dosing proper amount of urea based on monitored NOx emissions.

Other aftertreatment devices are additionally known for treating the exhaust gas flow. NOx treatment catalysts, such as three way catalysts (TWC) are utilized particularly in gasoline applications. Lean NOx traps (NOx trap) utilize catalysts capable of storing some amount of NOx, and engine control technologies have been developed to combine these NOx traps or NOx absorbers with fuel efficient engine control strategies to improve fuel efficiency and still achieve acceptable levels of NOx emissions. One exemplary strategy includes using a lean NOx trap to store NOx emissions during fuel lean operations and then purging the stored NOx during fuel rich, higher temperature engine operating conditions with conventional three-way catalysis to nitrogen and water. However, storing NOx during lower temperature engine operating conditions with conventional three-way catalysts limits NOx storage to exhaust gas feedstream $NO_2$ with the NOx trap, when the temperature of the three-way catalyst is too low to convert exhaust gas feedstream NO to $NO_2$. Diesel particulate filters (DPF) trap soot and particulate matter in diesel applications, and the trapped material is periodically purged in high temperature regeneration events. A high exhaust $NO_2$/NO fraction assists in this purging.

It is also known in the art that engine modeling of various types is helpful in understanding and predicting behavior in engines. These models incorporate various levels of complexity in the description of the physical and chemical processes that occur during engine operation and during the operation of various exhaust emissions treatment devices. Models that incorporate a relatively simple description of the physical processes and a more detailed description of the chemical processes occurring during combustion can be very useful in describing and obtaining reasonable predictions of engine phenomena that are highly dependent on combustion chemistry, such as exhaust gas constituent formation and destruction in the engine and exhaust, autoignition, and conversion of NO to $NO_2$ in an engine, while minimizing the cost and complexity involved in using the models.

SUMMARY

A powertrain includes an internal combustion engine having a combustion chamber and an aftertreatment system. A method for reducing NOx emissions in the powertrain includes monitoring an actual exhaust gas feedstream ratio of $NO_2$ to NO, monitoring a desired exhaust gas feedstream ratio of $NO_2$ to NO, comparing the actual and the desired exhaust gas feedstream ratios of $NO_2$ to NO, and selectively initiating a $NO_2$ generation cycle based upon the comparison of the actual and the desired exhaust gas feedstream ratios of $NO_2$ to NO comprising injecting fuel mass into the combustion chamber after a primary combustion event.

BRIEF DESCRIPTION OF THE DRAWINGS

One or more embodiments will now be described, by way of example, with reference to the accompanying drawings, in which.

DETAILED DESCRIPTION

Figure 1:
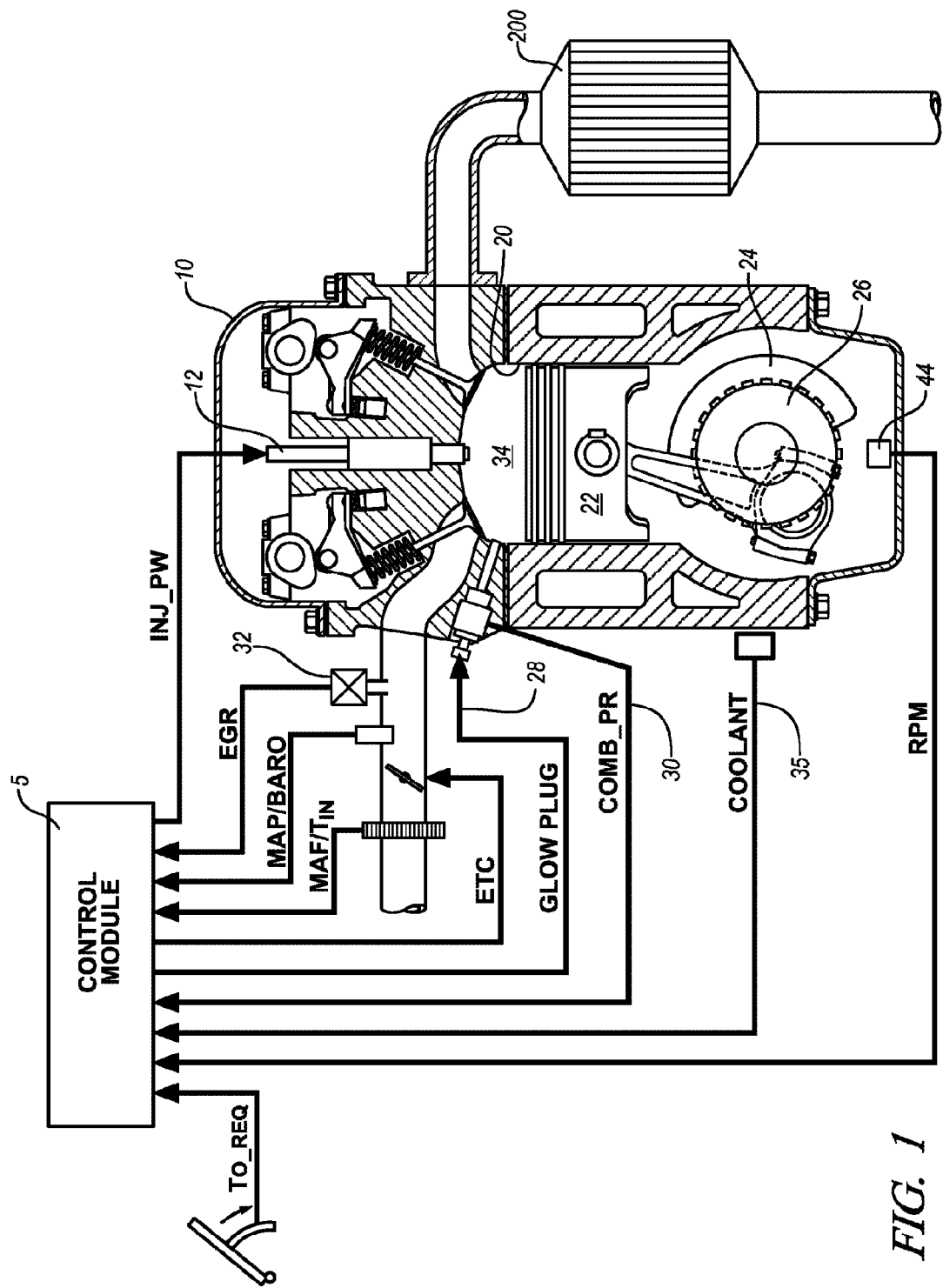
FIG. 1 is a schematic diagram depicting an internal combustion engine, a control module, and an exhaust aftertreatment system, in accordance with the present disclosure.

Referring now to the drawings, wherein the showings are for the purpose of illustrating certain exemplary embodiments only and not for the purpose of limiting the same, FIG. 1 is a schematic diagram depicting an internal combustion engine 10 and control module 5, and exhaust aftertreatment system 200, in accordance with the present disclosure. The exemplary engine includes a multi-cylinder, direct-injection internal combustion engine having reciprocating pistons 22 attached to a crankshaft 24 and movable in cylinders 20 which define variable volume combustion chambers 34. Engines are known to operate under compression ignition or spark ignition. Additionally, methods are known to utilize either ignition strategy in a single engine, modulating strategy based upon factors such as engine speed and load. Additionally, engines are known to operate in hybrid strategies, such as spark assisted, compression ignition strategies. This disclosure is intended to include these exemplary embodiments of engine operation, but is not intended to be limited thereto. The crankshaft 24 is operably attached to a vehicle transmission and driveline to deliver tractive torque thereto, in response to an operator torque request ($T_{O\_REQ}$). The engine preferably employs a four-stroke operation wherein each engine combustion cycle includes 720 degrees of angular rotation of crankshaft 24 divided into four 180-degree stages of intake-compression-expansion-exhaust, in a reciprocating movement of the piston 22 in the engine cylinder 20. A multi-tooth target wheel 26 is attached to the crankshaft and rotates therewith. The engine includes sensing devices to monitor engine operation, and actuators which control engine operation. The sensing devices and actuators are signally or operatively connected to control module 5.

The engine is preferably a direct-injection, four-stroke, internal combustion engine including a variable volume combustion chamber defined by the piston reciprocating within the cylinder between top-dead-center and bottom-dead-center points and a cylinder head including an intake valve and an exhaust valve. The piston reciprocates in repetitive cycles each cycle including intake, compression, expansion, and exhaust strokes.

The engine preferably has an air/fuel operating regime that is primarily lean of stoichiometry. One having ordinary skill in the art understands that aspects of the invention are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. The charge is subsequently combusted by action of compression thereof or with the initiation of spark from a spark plug during the compression stroke.

The engine is adapted to operate over a broad range of temperatures, cylinder charge (air, fuel, and EGR) and injection events. The methods described herein are particularly suited to operation with direct-injection engines operating lean of stoichiometry to determine parameters which correlate to heat release in each of the combustion chambers during ongoing operation. The methods defined herein are applicable to multiple engine configurations, including spark-ignition engines, compression-ignition engines including those adapted to use homogeneous charge compression ignition (HCCI) strategies. The methods are applicable to systems utilizing multiple fuel injection events per cylinder per engine cycle, e.g., a system employing a pilot injection for fuel reforming, a main injection event for engine power, and, where applicable, a post-combustion fuel injection, a late-combustion fuel injection event for aftertreatment management, each which affects cylinder pressure.

Sensing devices are installed on or near the engine to monitor physical characteristics and generate signals which are correlatable to engine and ambient parameters. The sensing devices include a crankshaft rotation sensor, including a crank sensor 44 for monitoring crankshaft speed (RPM) through sensing edges on the teeth of the multi-tooth target wheel 26. The crank sensor is known, and may include, e.g., a Hall-effect sensor, an inductive sensor, or a magnetoresistive sensor. Signal output from the crank sensor 44 (RPM) is input to the control module 5. A combustion pressure sensor 30 includes a pressure sensing device adapted to monitor in-cylinder pressure (COMB_PR). The combustion pressure sensor 30 preferably includes a non-intrusive device including a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the sensor 30. The output signal (COMB_PR) of the sensing element of sensor 30 is proportional to cylinder pressure. The sensing element of sensor 30 includes a piezoceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature ($T_{IN}$), and, a coolant sensor 35 (COOLANT). The system may include an exhaust gas sensor for monitoring states of one or more exhaust gas parameters, e.g., temperature, air/fuel ratio, and constituents. One having ordinary skill in the art understands that there may other sensing devices and methods for purposes of control and diagnostics. The operator input, in the form of the operator torque request ($T_{O\_REQ}$) is typically obtained through a throttle pedal and a brake pedal, among other devices. The engine is preferably equipped with other sensors for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable with functionally equivalent devices and algorithms and still fall within the scope of the invention.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request ($T_{O\_REQ}$). An exhaust gas recirculation valve 32 (and optional cooler) controls flow of externally recirculated exhaust gas to the engine intake in response to a control signal (EGR) from the control module. The glow-plug 28 includes a known device, installed in each of the combustion chambers, adapted for use with the combustion pressure sensor 30.

The fuel injector 12 is an element of a fuel injection system, which includes a plurality of high-pressure fuel injector devices each adapted to directly inject a fuel charge, including a mass of fuel, into one of the combustion chambers in response to the command signal (INJ_PW) from the control module. Each of the fuel injectors 12 are supplied pressurized fuel from a fuel distribution system, and have operating characteristics including a minimum pulsewidth and an associated minimum controllable fuel flow rate and a maximum fuel flowrate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift, on systems so equipped. The control module is adapted to receive input signals from the operator (e.g., a throttle pedal position and a brake pedal position) to determine the operator torque request ($T_{O\_REQ}$) and from the sensors indicating the engine speed (RPM) and intake air temperature ($T_{IN}$), and coolant temperature and other ambient conditions.

FIG. 1 describes an exemplary gasoline engine. However, it will be appreciated that NOx treatment and aftertreatment systems are utilized in other engine configurations including diesel engines, and the disclosure is not intended to be limited to the specific exemplary engine embodiment described herein.

Methods disclosed herein relate to increasing the exhaust gas feedstream concentration of $NO_2/NO$ ratio to improve various NOx reduction aftertreatment devices in an aftertreatment system. NOx reduction aftertreatment devices can include TWC devices (i.e., applicable to gasoline engines), NOx traps, urea-SCR devices, hydrocarbon-SCR devices, DOC devices and DPF devices. It is appreciated that DOC and DPF devices are applicable to diesel engines. This disclosure is not intended to be limited to the specific exemplary engine embodiments described herein. It is appreciated that most NOx emitted from an internal combustion engine is in the form of NO, wherein only one-fourth to one-third of the NOx present as $NO_2$. The low ratio of $NO_2$ to NO in a known exhaust gas feedstream reduces the effectiveness of these NOx reduction aftertreatment devices in the aftertreatment system. A method includes initiating a $NO_2$ generation cycle to increase the presence of $NO_2$ present in NOx. When an amount of fuel (i.e., hydrocarbon) is injected into the engine cylinder during the expansion stroke, oxidation of NO to $NO_2$ results from the chemical reaction corresponding to the following equation.

$$NO+HO_2 \Rightarrow NO_2+OH \qquad [1]$$

wherein $HO_2$ is a radical present in relatively high concentration when fuel is injected into the cooling burned gas from the primary combustion event and is effective at oxidizing NO to $NO_2$. $HO_2$ increases mainly due to the chemical reaction corresponding to the following equation.

$$HCO+O_2 \Rightarrow CO+HO_2 \qquad [2]$$

Furthermore, OH reacts rapidly with hydrocarbons present in the fuel, producing more $HO_2$ via multiple reactions including the chemical reactions corresponding to the following equations.

$$RH+OH \Rightarrow R+H_2O \qquad [3]$$

$$R+O_2 \Rightarrow alkene+HO_2 \qquad [4]$$

It should be appreciated by Eq. 1-4 that there is a mutual sensitization of hydrocarbon and NO oxidation. The presence of NO accelerates hydrocarbon oxidation by converting the relatively unreactive $HO_2$ into highly reactive OH and hydrocarbon oxidation accelerates NO oxidation by producing $HO_2$. OH concentration decreases due to reactions with the injected fuel molecules and partial oxidation products of the fuel such as formaldehyde and ethylene. Therefore, injecting a quantity of injected fuel mass into the cylinder during the expansion stroke generates $NO_2$ by oxidizing NO. The increase in $NO_2$ can increase the storing efficiency of aftertreatment devices such as NOx traps and can also increase the effectiveness of hydrocarbon- and urea-SCR devices when an oxidation catalyst is not active and lean engine operation is desired. Additionally, high $NO_2$ levels can assist in the regeneration of a DPF device when an upstream DOC device is not active for NO oxidation. It is appreciated that the exemplary method can inject fuel mass into one, all or a portion of the cylinders in a multi-cylinder engine during the expansion stroke to generate $NO_2$ in the exhaust gas feedstream.

Examples disclosed herein utilizing the exemplary $NO_2$ generation cycle are calculated utilizing an exemplary engine model. The engine model includes a zero-dimensional, seven-zone engine homogeneous charge compression ignition (HCCI) combustion model operated with detailed chemical kinetics. The combustion model utilizes n-heptane fuel and a compression ratio of 16.8. The combustion model of the exemplary engine model includes an intake valve closing (IVC) of −138 degrees and an exhaust valve opening (EVO) of 129 degrees. The engine model is used to simulate single closed engine cycles from IVC to EVO. The bore, stroke and connecting rod dimensions in the exemplary engine model are 103 mm, 99 mm and 163 mm, respectively. It should be appreciated that the seven-zone engine model includes six combustion zones, in which most of the fuel combustion occurs, and one crevice, in which partial fuel oxidation may occur. The sixth model zone represents that part of the main engine cylinder that is adjacent to the in-cylinder crevice, which is represented by the seventh model zone. Exchange of mass and energy is allowed between the seventh model zone and the sixth model zone, simulating the entry and exit of gases from the main combustion chamber into and out of the crevice during engine operation. Additionally, the exemplary engine model adjusts NO and $NO_2$ mass fractions in the engine cylinder at 30 degrees after top dead center (aTDC) in order to match the model exhaust NOx concentration with the NOx concentration measured in an actual engine exhaust at an exemplary engine operating condition. The matching prepares the temperature and composition of the post-combustion gases in the model to closely simulate the temperature and composition present at an exemplary operating condition of the actual engine cycle. Furthermore, the exemplary engine model describes the injection of various quantities of injected fuel mass aTDC during the expansion stroke, starting at various crank angle locations aTDC and continuing for a controllable period, wherein the fuel is either uniformly or non-uniformly distributed among the zones and vaporizes instantly. It is further appreciated that the exemplary engine model has been used for testing conditions indicative of Heavy-Duty Federal Testing Procedure (HD-FTP). The exemplary engine model can also be used for testing conditions indicative of the Federal Testing Procedure (FTP) or testing conditions indicative of any other driving cycle or reciprocating engine type by incorporating specific engine testing conditions and parameters into the model.

Figure 2:
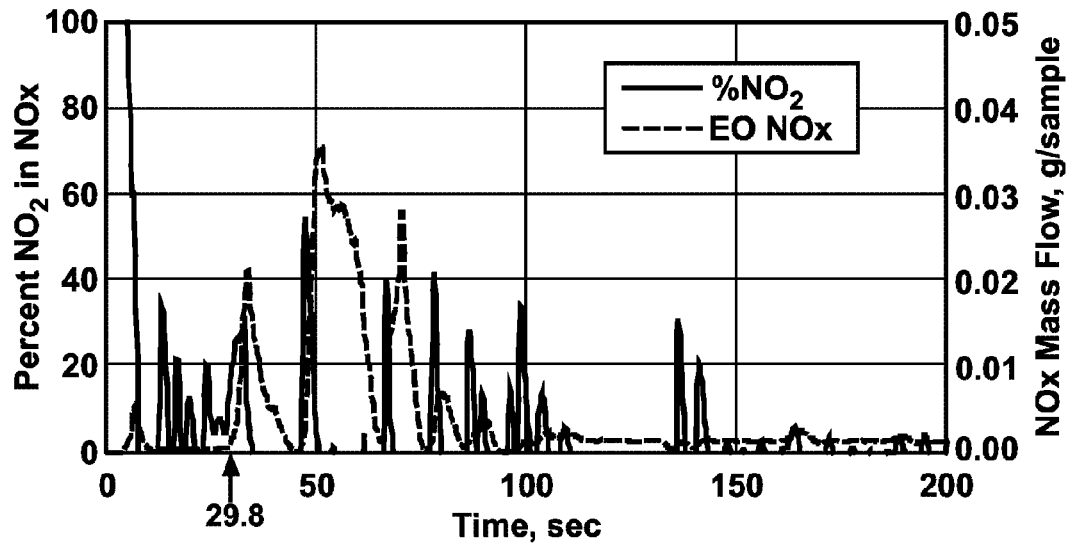
FIG. 2 graphically illustrates an example of operation of an engine and resulting measured percentage of NOx present as $NO_2$ and NOx mass flow in an exhaust gas feedstream plotted against time, in accordance with the present disclosure.

FIG. 2 graphically illustrates an experimental measurement of the resulting percentage of NOx present as $NO_2$ and the NOx mass flow in an exhaust gas feedstream during operation of an exemplary engine testing apparatus, consisting of a conventional diesel engine and accompanying control and test equipment, during the first 200 seconds of the aforementioned HD-FTP, in accordance with the present disclosure. The testing conditions of the engine model are indicative of testing conditions of HD-FTP. The axis of abscissa represents time (sec) and the axis of ordinate represents the percentage of NOx present as $NO_2$ in the exhaust gas feedstream. It is evident over the first 200 seconds of operation of the exemplary testing apparatus the $NO_2$ percentage and the NOx mass flow in the exhaust gas feedstream vary significantly. It is also evident that the $NO_2$ percentage, while subject to significant variation during the first 100 seconds, remains significantly below 50% for most of this period. It is appreciated that both the $NO_2$ percentage and the NOx mass flow decrease and generally stabilize between 150 seconds and 200 seconds. As aforementioned, a $NO_2$ percentage of 50% or higher is advantageous for a number of NOx aftertreatment methods within the aftertreatment system, particularly during this warm-up period when other devices intended to increase the $NO_2$ percentage, such as an oxidation catalyst, are too low in temperature to permit conversion of NO to $NO_2$ within the exhaust gas feedstream.

One set of initial conditions for use with the engine model consists of experimental data taken from a first testing condition when time is equal to substantially 29.8 seconds after the start of operation of the engine testing apparatus, as shown in FIG. 2. The first testing condition, when time is equal to substantially 29.8 seconds, is during a period of warm-up, such as cold-start operation for the exemplary engine model. At this time, the concentration of NOx within the exhaust gas feedstream is high, and the ratio of $NO_2$ to NO is lower than that desirable for NOx aftertreatment devices, as described previously. The first testing condition includes an intake manifold absolute pressure (MAP) of 1.46 bar, engine speed at 1664 rpm and initial temperature at 300K, wherein CA-50 is located at TDC. It is appreciated, that CA-50 is a measurement of the crank angle at which 50% of the mass of fuel originally present in the combustion chamber is combusted. Furthermore, the first testing condition includes the injected fuel mass during primary injection is 29.2 mg, the exhaust gas recirculation (EGR) residual is 15 mole percent, the equivalence ratio ($\phi$) is 0.39, $O_2$ present in the exhaust gas feedstream is 13.2% and the quantity of NOx present in the exhaust gas feedstream is 400 ppm.

Figure 3:
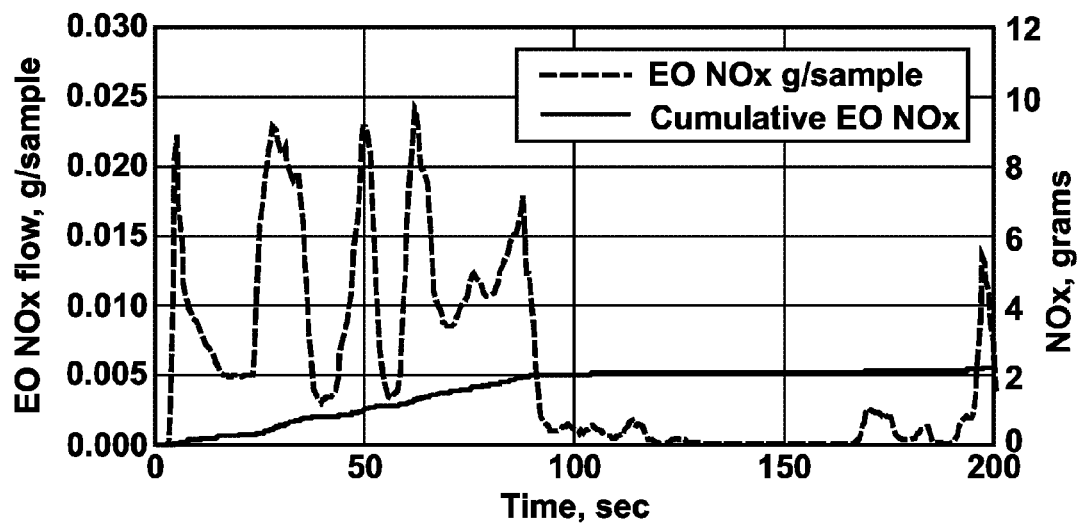
FIG. 3 graphically illustrates an example of operation of an engine during the first 200 seconds and resulting measured NOx mass flow and cumulative NOx content present in an exhaust gas feedstream, in accordance with the present disclosure.

FIG. 3 graphically illustrates operation of the exemplary engine testing apparatus during the first 200 seconds of the HD-FTP and the resulting NOx mass flow and cumulative NOx content present in the exhaust gas feedstream, in accordance with the present disclosure. The axis of abscissa represents time (sec) and the axis of ordinate represents the NOx mass flow (g/sample) and a total cumulative NOx (grams) within the exhaust gas feedstream, wherein the sample rate is approximately once per second. It is appreciated at time 29.8 seconds, conditions indicative of the testing condition described above are present. Furthermore, the total cumulative NOx emitted by the engine is equal to 3.34 grams at 200 seconds.

Figure 4:
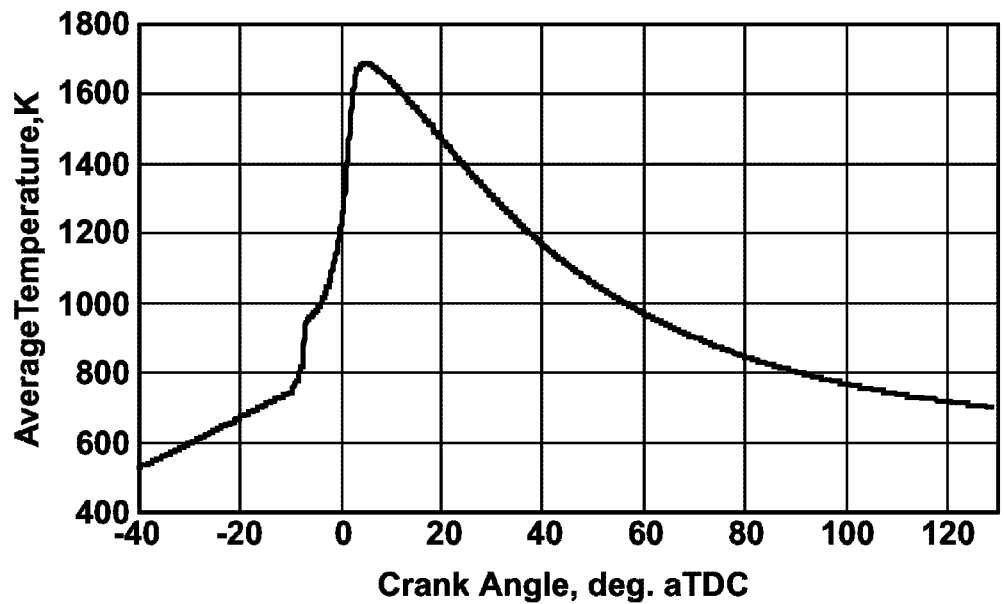
FIG. 4 graphically illustrates an exemplary average in-cylinder temperature during a combustion process model-calculated according to crank angle from before to after top dead center, in accordance with the present disclosure.

FIG. 4 graphically illustrates an example of an average in-cylinder temperature during the combustion process at the first testing condition calculated according to crank angle aTDC for the exemplary engine model. It should be appreciated that when no fuel is injected during the expansion stroke, this graphical representation merely illustrates that in-cylinder temperature decreases as the crank angle location aTDC increases after the peak heat release resulting from the primary combustion event. Furthermore, the temperature during much of the expansion stroke is high enough (above 800 K) to initiate at least some oxidation of fuel injected during the expansion stroke.

FIGS. 5-11 graphically illustrate model results of the first testing condition including adjusted testing parameters where NOx content in the engine model is adjusted to 397 ppm at 30 degrees aTDC, and having a ratio of $NO_2$ to NOx in the model adjusted to yield 20 percent NOx present as $NO_2$ in the exhaust gas feedstream at the EVO in the absence of injected fuel mass during the expansion stroke, in order to match the NOx content and ratio of $NO_2$ to NOx measured in the engine exhaust gas feedstream, in accordance with the present disclosure.

Figure 5:
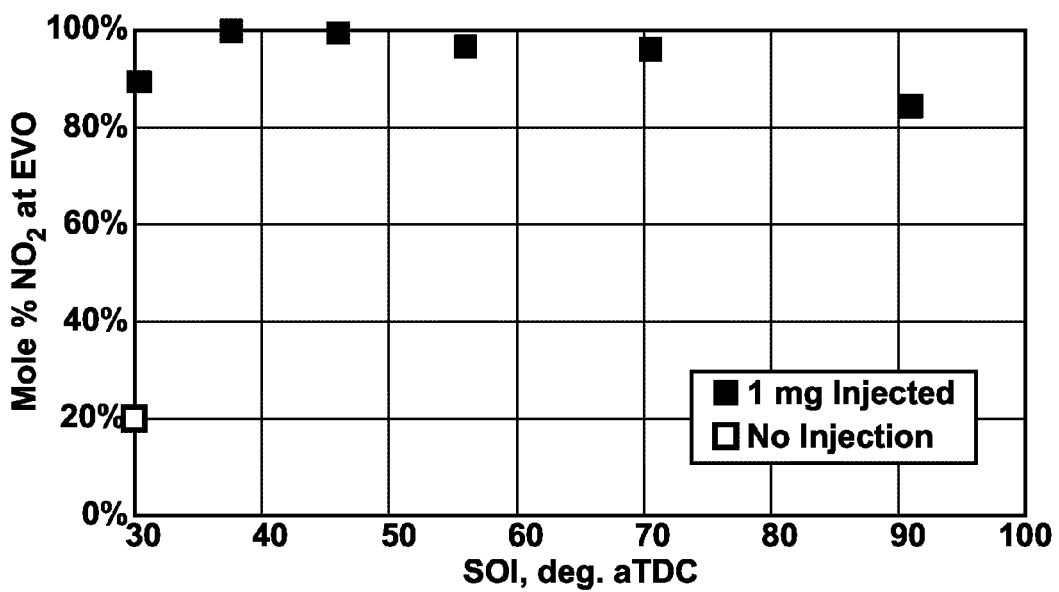
FIG. 5 graphically illustrates an injected fuel mass at various start of injection locations according to crank angle during the expansion stroke of a modeled combustion event and resulting percentage of $NO_2$ in NOx present in an exhaust gas feedstream, in accordance with the present disclosure.

FIG. 5 graphically illustrates model results for 1.0 mg of injected fuel mass at various start of injection (SOI) locations according to crank angle aTDC during the expansion stroke of a combustion event representing the first testing condition and the resulting percentage of NOx present as $NO_2$ in the exhaust gas feedstream, in accordance with the present disclosure. A person having ordinary skill in the art understands SOI location to be a location at which injected fuel mass is injected. The axis of abscissa represents the SOI location according to crank angle aTDC (SOI, deg. aTDC) and the axis of ordinate represents the percentage of NOx present as $NO_2$ at the EVO (Mole % $NO_2$ at EVO). The percentage of NOx present as $NO_2$ at the EVO is hereinafter referred to as the $NO_2$ percentage at EVO. It is appreciated that the $NO_2$ percentage at EVO is greatly increased when the 1.0 mg of fuel mass is injected during the expansion stroke. For example, a 1.0 mg injected fuel mass at 30 degrees aTDC increases the $NO_2$ percentage at EVO to at or near 90 percent, as opposed to the adjusted testing parameter of $NO_2$ percentage at EVO at 30% without an injected fuel mass during the expansion stroke.

Figure 6:
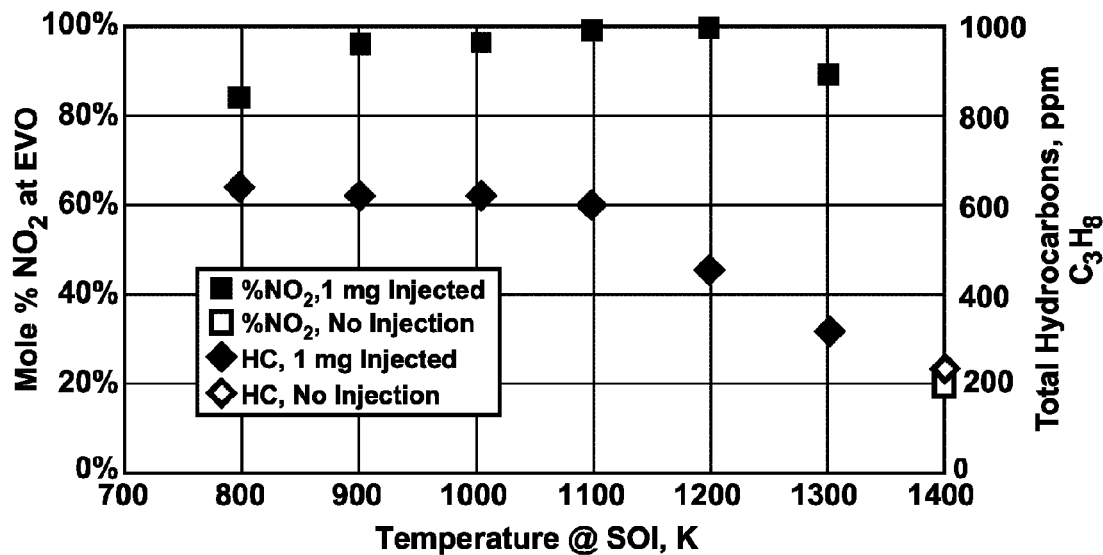
FIG. 6 graphically illustrates an injected fuel mass at various start of injection locations according to temperature during a modeled combustion event and resulting percentage of $NO_2$ in NOx and total hydrocarbons present in an exhaust gas feedstream, in accordance with the present disclosure.

FIG. 6 graphically illustrates model results for 1.0 mg of injected fuel mass at various SOI locations according to temperature during the expansion stroke of a combustion event representing the first testing condition and the resulting percentage of NOx present as $NO_2$ and the total hydrocarbons present in the exhaust gas feedstream, in accordance with an the present disclosure. The axis of abscissa represents the temperature at the SOI location (Temperature @ SOI, K) and the axis of ordinate represents the $NO_2$ percentage at EVO (Mole % $NO_2$ at EVO) and the total hydrocarbons (Total Hydrocarbons, ppm) The total hydrocarbons concentration is expressed as an equivalent concentration of propane, $C_3H_8$. As mentioned above, it is appreciated that the exemplary engine model utilizes n-heptane fuel having a chemical composition of $C_7H_{16}$. It is also appreciated that the $NO_2$ percentage at EVO depends on the temperature at SOI, with a broad maximum between temperatures at SOI of approximately 900 K and 1200 K. It is also appreciated that the injected fuel mass during the expansion stroke to achieve a high $NO_2$ percentage at EVO at the first testing condition will result in an increase in hydrocarbon emissions, due to incomplete oxidation of the injected fuel. The increase in hydrocarbon emissions can be minimized at this condition by injecting the fuel at an SOI corresponding to an in-cylinder temperature of approximately 1300 K, corresponding to an SOI of 30 degrees aTDC at the first testing condition.

Figure 7:
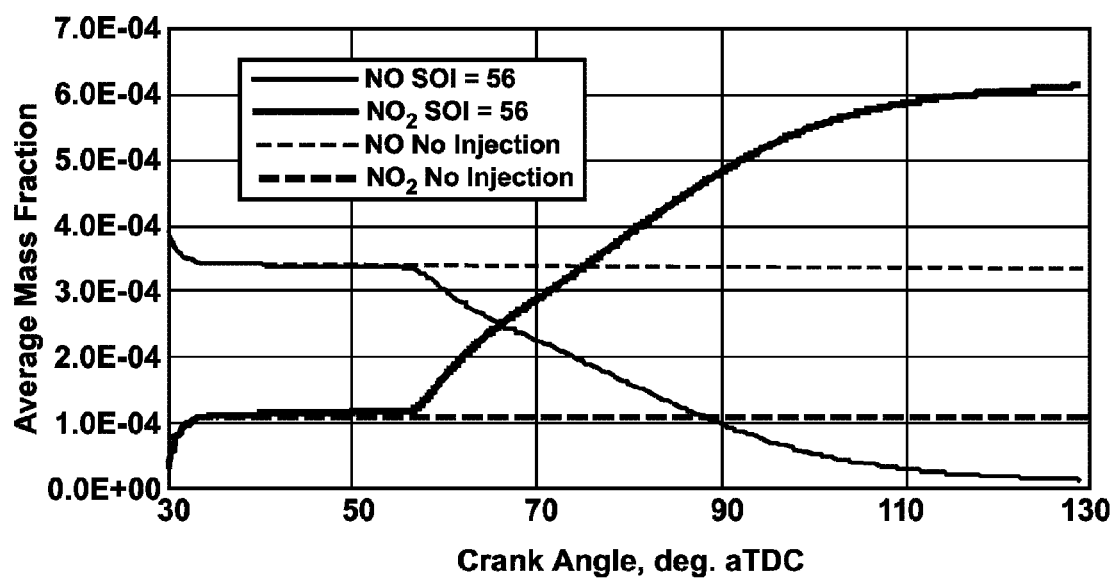
FIG. 7 graphically illustrates NO and $NO_2$ average mass fractions after an injected fuel mass according to a start of injection crank angle of 56 degrees after top dead center during a modeled combustion event, in accordance with the present disclosure.

FIG. 7 graphically illustrates model results for NO and $NO_2$ average mass fractions before and after an injected fuel mass of 1.0 mg at 56 degrees aTDC during a combustion event, representing the first testing condition in accordance with the present disclosure. NO and $NO_2$ average mass fractions with no injected fuel mass during the expansion stroke are also depicted. The axis of abscissa represents the crank angle (degrees aTDC) and the axis of ordinate represents the average mass fraction. It is appreciated that some time is required for NO and $NO_2$ to adjust to new and higher average mass fractions at and shortly after a crank angle location of 30 degrees, due to unburned fuel exiting the crevice and entering the sixth zone, resulting in oxidation of NO to $NO_2$. This is an artifact of the modeling method used here, in which the NO and $NO_2$ mass fractions are adjusted at 30 deg. aTDC, as described previously, to account for the much higher NOx mass fraction in the conventional diesel engines compared to the low NOx mass fraction just before 30 deg. aTDC in HCCI engines. The oxidation of NO to $NO_2$ after fuel injection is expected to occur in a similar fashion in the engine to that shown in the model results because the oxygen and diluents (principally $N_2$, $CO_2$, and $H_2O$) concentration during the expansion stroke in the model and the engine are the same. The temperatures are also likely to be approximately the same because the same amount of fuel is burned, although there may be some differences in heat loss between the model and the engine. FIG. 6 shows that the maximum amount of $NO_2$ is produced over a broad range of temperature at SOI, so it is expected that the effect on NO to $NO_2$ conversion of a difference in the temperature history between the model and the actual engine will be small. It is further appreciated, and in accordance with the exemplary method disclosed herein, that the average mass fraction of $NO_2$ drastically increases as the average mass fraction of NO decreases when the fuel mass is injected at crank angle location of 56 degrees aTDC.

Figure 8:
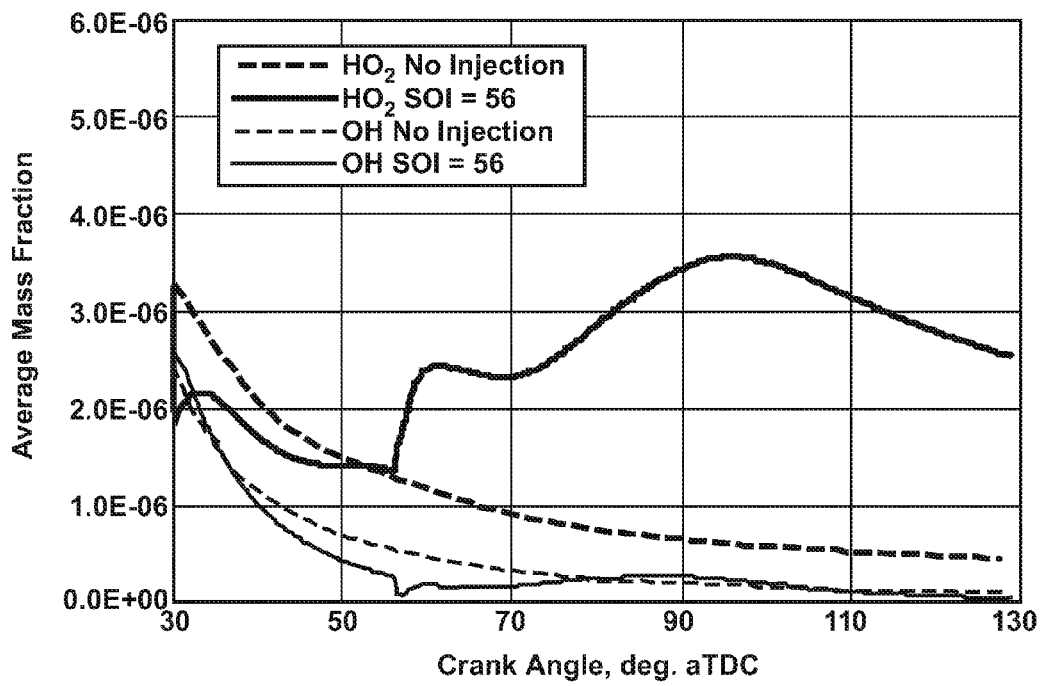
FIG. 8 graphically illustrates OH and $HO_2$ mass fractions after an injected fuel mass according to a start of injection crank angle of 56 degrees after top dead center during a modeled combustion event, in accordance with the present disclosure.

FIG. 8 graphically illustrates OH and $HO_2$ average mass fractions before and after an injected fuel mass at 56 degrees aTDC during a combustion event, representing the first testing condition in accordance with the present disclosure. The "No Injection" OH and $HO_2$ mass fractions correspond to modeling conditions in which the NO and $NO_2$ mass fractions are not adjusted to match the NO and $NO_2$ mass fractions in the actual engine exhaust. The "No Injection" OH and $HO_2$ mass fractions corresponding to the modeling conditions in which the NO and $NO_2$ mass fractions are adjusted to match the NO and $NO_2$ mass fractions in the actual engine exhaust are identical to the "SOI=56" concentrations between 30 degrees aTDC and 56 degrees aTDC, and then both concentrations continue to slowly decline after 56 degrees aTDC. The axis of abscissa represents the crank angle (degrees aTDC) and the axis of ordinate is the average mass fraction. It is appreciated that the $HO_2$ and OH mass fractions respond very rapidly to the new and higher adjusted NOx mass fraction shortly after 30 degrees aTDC, due to unburned fuel exiting the crevice and entering the sixth model zone, resulting in some oxidation of NO to $NO_2$. As discussed above, the sixth model zone represents that part of the main engine cylinder that is adjacent to the in-cylinder crevice, which is represented by the seventh model zone. The response of the $HO_2$ and OH mass fractions to the adjusted NO and $NO_2$ mass fractions shortly after 30 degrees aTDC does not unduly interfere, however, with the dramatic change in the OH and $HO_2$ mass fractions just after the injected fuel mass is delivered at an SOI of 56 degrees aTDC. It is appreciated that the $HO_2$ mass fraction increases and the OH mass fraction decreases after injected fuel mass at 56 degrees aTDC. As mentioned above with reference to Eq. 1-4, OH and $HO_2$ are produced and consumed by many reactions. OH concentration decreases mainly due to reactions with injected fuel molecules and partial oxidation products of the fuel. $HO_2$ increases mainly due to Eq. 2 during oxidation of the injected fuel mass, and thus increases the rate of $NO_2$ production by Eq. 1.

Figure 9:
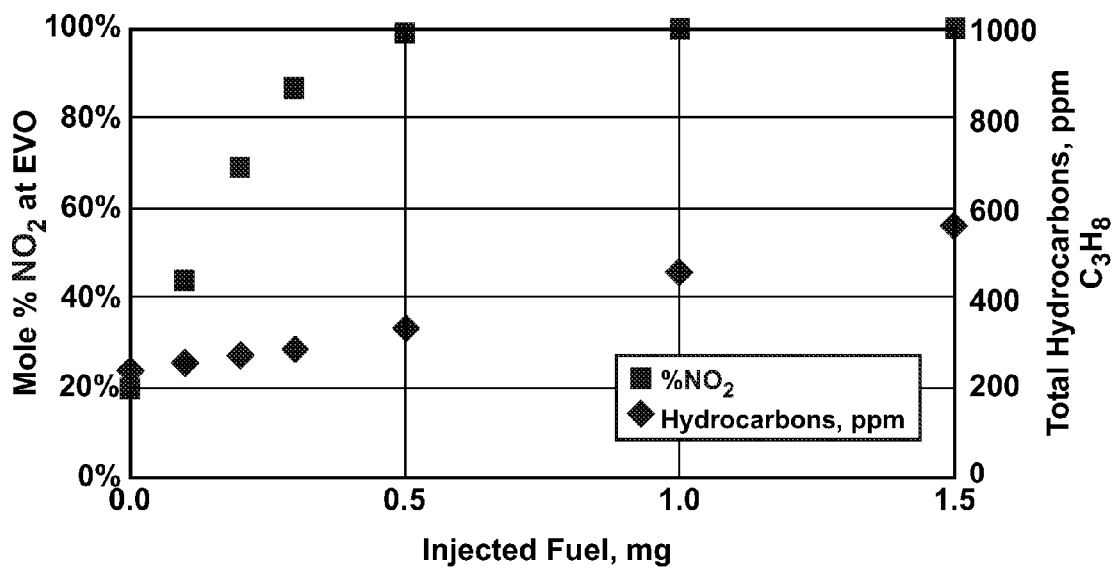
FIG. 9 graphically illustrates various model-calculated quantities of injected fuel mass at a start of injection of 37.6 degrees after top dead center during an expansion stroke and resulting percentage of $NO_2$ in NOx and total hydrocarbons present in an exhaust gas feedstream, in accordance with the present disclosure.
Figure 10:
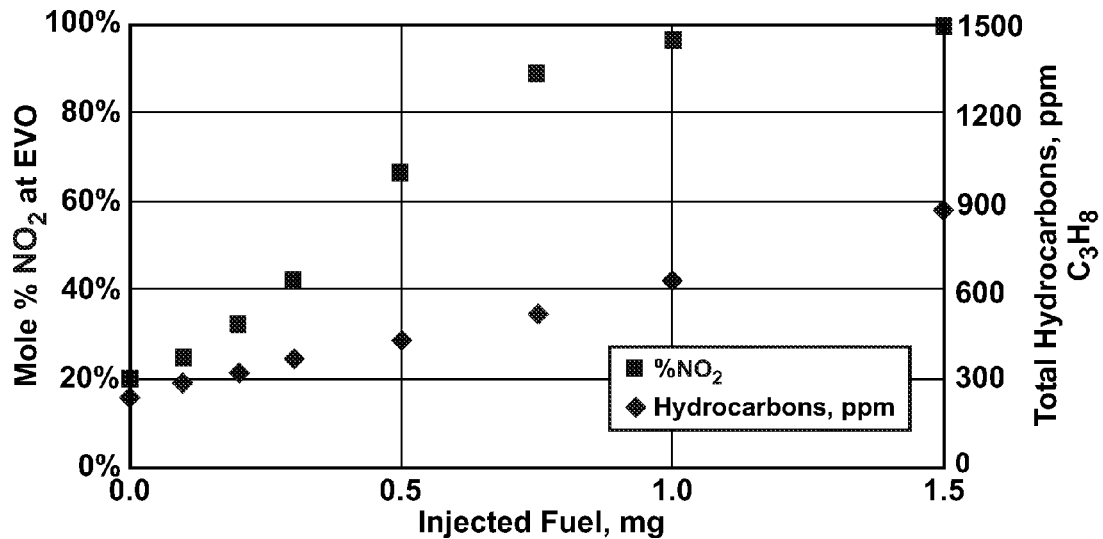
FIG. 10 graphically illustrates various model-calculated quantities of injected fuel mass at a start of injection of 56 degrees after top dead center during an expansion stroke and resulting percentage of $NO_2$ in NOx present and total hydrocarbons present in an exhaust gas feedstream, in accordance with an exemplary embodiment of the present disclosure.

FIGS. 9 and 10 graphically illustrate modeling results obtained by varying the injected fuel mass quantity at two different SOI during the expansion stroke of a combustion event representing the first testing condition and resulting $NO_2$ percentage and total hydrocarbon emissions at EVO, in accordance with the present disclosure. The axis of abscissa represents the injected fuel mass (mg) and the axis of ordinate represents the $NO_2$ percentage at EVO (Mole % $NO_2$ at EVO) and total hydrocarbon emissions (ppm) at EVO. As mentioned above, the total hydrocarbons concentration is expressed as an equivalent concentration of propane, $C_3H_8$. Referring back to FIG. 4, temperature can be determined when the SOI location according to crank angle is known. It will become apparent that higher $NO_2$ percentage at EVO leads to higher hydrocarbon emissions.

Referring to FIG. 9, varying the injected fuel mass quantity at a SOI of 37.6 degrees aTDC during the expansion stroke and resulting $NO_2$ percentage and total hydrocarbons at EVO is depicted, wherein the in-cylinder temperature at SOI is 1200K. It is appreciated that the maximum $NO_2$ percentage at EVO is attained at and above approximately 0.5 mg of injected fuel mass for this SOI. It is also appreciated that to achieve a desired 50 $NO_2$ mole percent at this condition requires the injection of approximately 0.15 mg of injected fuel, resulting in only a very modest increase in total hydrocarbons at EVO compared to no fuel injection.

Referring to FIG. 10, varying the injected fuel mass quantity at an SOI of 56 degrees aTDC during the expansion stroke and resulting $NO_2$ percentage and total hydrocarbons at EVO is depicted, wherein the in-cylinder temperature is 1000K. It is appreciated that the maximum $NO_2$ percentage at EVO is attained above 1.0 mg of injected fuel mass for this SOI. Thus, increasing the $NO_2$ percentage at EVO requires a greater quantity of injected fuel mass during lower in-cylinder temperatures at SOI. Therefore, when an injected fuel mass is injected earlier in the expansion stroke, less fuel mass is required to increase the $NO_2$ percentage at EVO resulting in less hydrocarbon emissions.

Figure 11:
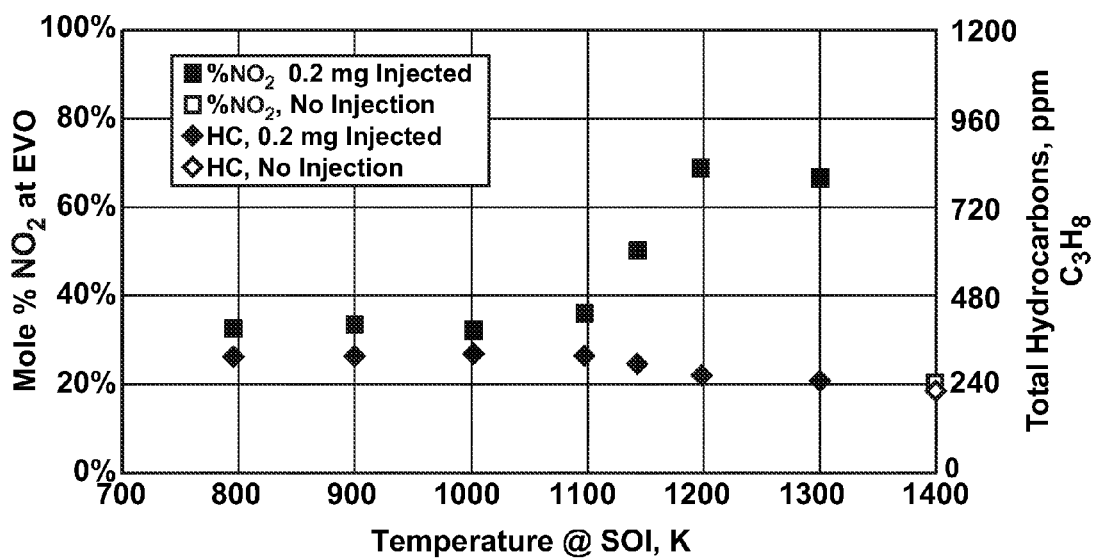
FIG. 11 graphically illustrates injected fuel mass at various start of injection locations according to temperature during a modeled combustion event and resulting percentage of $NO_2$ in NOx and total hydrocarbons present in an exhaust gas feedstream, in accordance with the present disclosure.

In another example, FIG. 11 graphically illustrates a 0.2 mg injected fuel mass at various SOI locations according to temperature during the expansion stroke of a combustion event representing the first testing condition and the resulting percentage of NOx present as $NO_2$ and the total hydrocarbons present at EVO, in accordance with the present disclosure. The axis of abscissa represents the temperature at the SOI location (Temperature @ SOI, K) and the axis of ordinate represents the $NO_2$ percentage at EVO (Mole % $NO_2$ at EVO) and the total hydrocarbons (Total Hydrocarbons, ppm) at EVO. As mentioned above, it is appreciated that the total hydrocarbons concentration is expressed as an equivalent concentration of propane, $C_3H_8$. It is appreciated that the hydrocarbon emissions are low over the range of injection temperatures. Furthermore, it is evident that the lowest hydrocarbon emission is present at the highest $NO_2$ percentage at EVO.

In another exemplary embodiment, the exemplary engine model uses experimental data taken from a second testing condition when time is equal to 71.8 seconds after the start of operation of the engine testing apparatus, in accordance with the present disclosure. The second testing condition when time is equal to 71.8 seconds is indicative of a period during warm-up when temperatures within the exemplary engine exhaust system are likely somewhat higher than at the first testing condition, but which still could be too low for efficient operation of an oxidation catalyst or a three-way catalyst to convert NO to $NO_2$. The first and second conditions are two of several engine conditions which have been modeled in order to explore the effect of various engine operating conditions, and hence various temperatures and mass fractions of oxygen, fuel, and diluents, and various $NO_2/NO$ ratios, on the in-cylinder conversion of NO to $NO_2$. The exemplary second testing condition when time is equal to 71.8 seconds includes a MAP of 1.03 bar, engine speed at 1281 rpm and initial temperature at 320K, wherein TDC is equal to CA-50. Furthermore, the exemplary second set of testing conditions when time is equal to 71.8 seconds includes the injected fuel mass for primary combustion is 15.9 mg, the EGR residual is 15.4 mole percent, $\phi$ is 0.31, final $O_2$ in the exhaust gas feedstream is 16.1% and the quantity of NOx present in the exhaust gas feedstream is 318 ppm.

Figure 12:
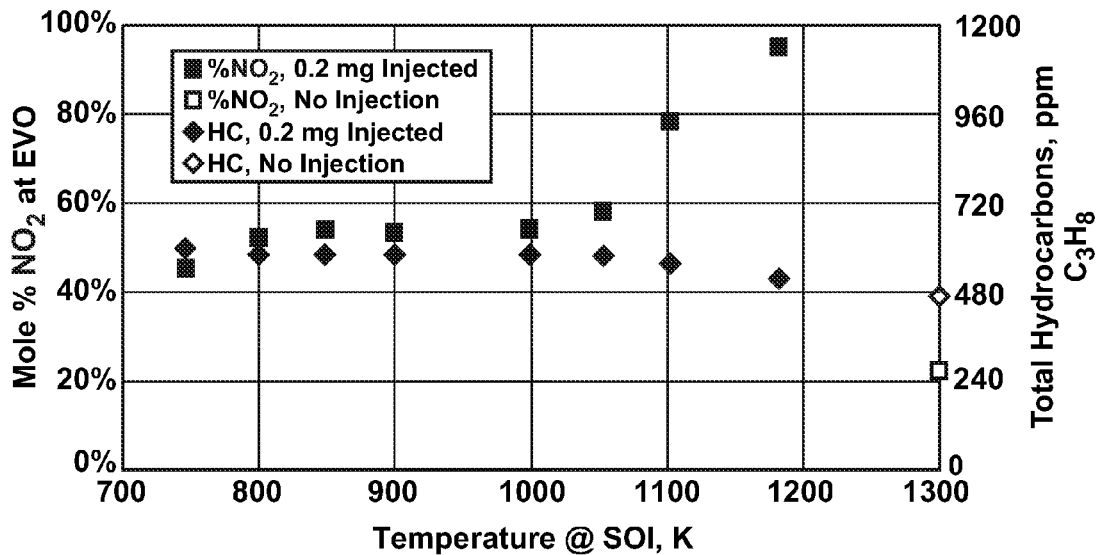
FIG. 12 graphically illustrates injected fuel mass at various start of injection locations according to temperature during a modeled combustion event and resulting percentage of $NO_2$ in NOx and total hydrocarbons present in an exhaust gas feedstream, in accordance with the present disclosure.
Figure 13:
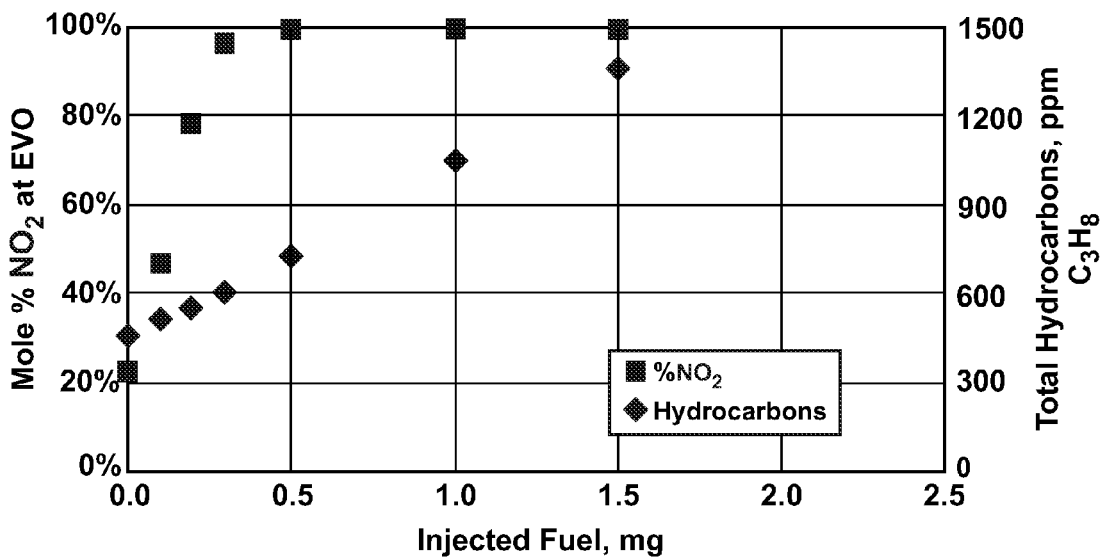
FIG. 13 graphically illustrates various quantities of injected fuel mass at 36 degrees after top dead center during an expansion stroke of a modeled combustion event and resulting percentage of $NO_2$ in NOx and total hydrocarbons present in an exhaust gas feedstream, in accordance with the present disclosure.
Figure 14:
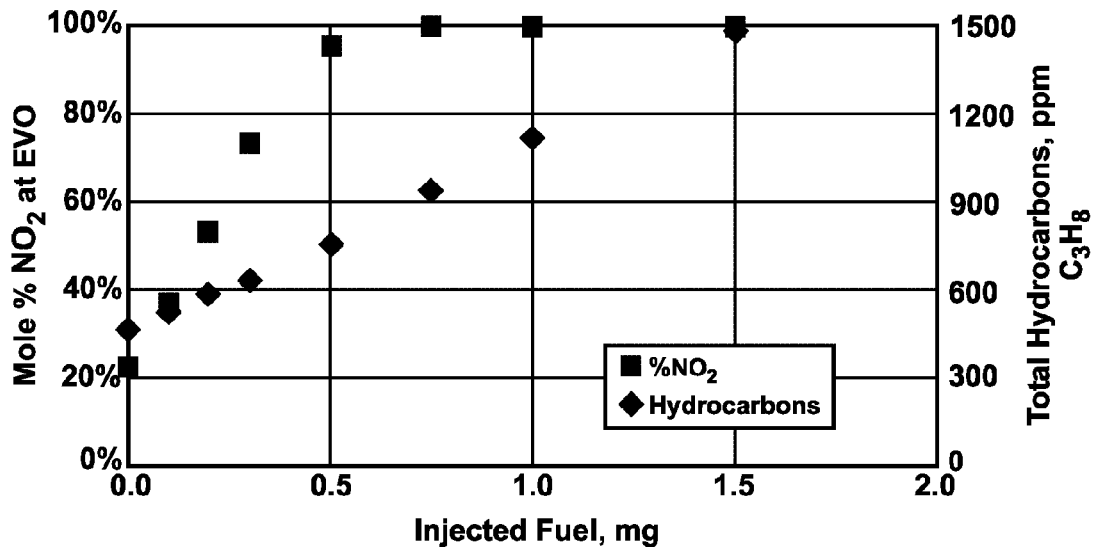
FIG. 14 graphically illustrates various model-calculated quantities of injected fuel mass at 56 degrees after top dead center during an expansion stroke and resulting percentage of $NO_2$ in NOx and total hydrocarbons present in an exhaust gas feedstream, in accordance with the present disclosure.

FIGS. 12-14 graphically illustrate model results of the second testing condition at time is equal to 71.8 seconds including adjusted testing parameters where NOx content in the model is adjusted to 318 ppm at 30 degrees aTDC, and having a ratio of $NO_2$ to NOx in the model adjusted to yield 22 percent NOx present as $NO_2$ in the exhaust gas feedstream at EVO.

FIG. 12 graphically illustrates a 0.2 mg injected fuel mass at various SOI locations according to temperature during the expansion stroke of a combustion event and the resulting percentage of NOx present as $NO_2$ and the total hydrocarbons present in the exhaust gas feedstream, in accordance with the present disclosure. The axis of abscissa represents the temperature at the SOI location (Temperature @ SOI, K) and the axis of ordinate represents the $NO_2$ percentage at EVO (Mole % $NO_2$ at EVO) and the total hydrocarbons (Total Hydrocarbons, ppm). It is appreciated that the results illustrated in FIG. 12 are qualitatively similar to the results illustrated in FIG. 11 utilizing the first testing condition at time equal is equal to 29.8 seconds. However, the $NO_2$ percentage and the hydrocarbon emissions at EVO are increased during the second testing condition at time equal to 71.8 seconds. Based on results from all the testing conditions modeled, this is likely due to the lower initial NO and $NO_2$ mass fractions at SOI compared to the first testing condition. It is further appreciated with reference to FIGS. 11 and 12 that if a desired aftertreatment device requires a $NO_2$ percentage at EVO to be 50 percent (i.e., $NO_2$/NO ratio is 1:1), the 0.2 mg injected fuel mass would have to occur later in the expansion stroke when the temperature is at or near 1150K for the first testing condition as opposed to anywhere in the temperature range of 750K to 1000K for the second testing condition.

FIGS. 13 and 14 graphically illustrate modeling results obtained by varying the quantity of injected fuel mass at constant SOI during the expansion stroke of a combustion event representing the second testing condition and resulting $NO_2$ percentage at EVO and total hydrocarbon emissions in the exhaust gas feedstream, in accordance with the present disclosure. The axis of abscissa represents the injected fuel mass (mg) and the axis of ordinate represents the $NO_2$ percentage at EVO (Mole % $NO_2$ at EVO) and total hydrocarbon emissions (ppm). Referring back to FIG. 4, in-cylinder temperature can be determined when the SOI location according to crank angle is known. It is apparent that higher $NO_2$ percentage at EVO leads to higher hydrocarbon emissions. Additionally, increasing the quantity of injected fuel mass increases the $NO_2$ percentage at EVO.

Referring to FIG. 13, model results for various quantities of injected fuel mass injected at 36 degrees aTDC during the expansion stroke and resulting $NO_2$ percentage and total hydrocarbons at NVO are depicted, wherein the in-cylinder temperature is 1100K at SOI. It is appreciated that the maximum $NO_2$ percentage at EVO is attained at and above 0.5 mg of injected fuel mass.

Referring to FIG. 14, model results for various quantities of injected fuel mass injected at 56 degrees aTDC during the expansion stroke and resulting $NO_2$ percentage and total hydrocarbons at EVO are depicted, wherein the in-cylinder temperature is 900K at SOI. It is appreciated that the maximum $NO_2$ percentage at EVO is attained at and above substantially 0.75 mg of injected fuel mass. Thus, increasing the $NO_2$ percentage at EVO requires greater quantities of injected fuel mass during lower in-cylinder temperatures. Therefore, when an injected fuel mass is injected earlier in the expansion stroke, less fuel mass is required to increase the $NO_2$ percentage at EVO resulting in less hydrocarbon emissions.

Table 1 below depicts some of the chemical reactions involved in low-temperature oxidation of n-heptane, where decomposition of oxygenated intermediates is the main route to yielding OH.

TABLE 1

| | |
|---|---|
| $n\text{-}C_7H_{16} + OH => n\text{-}C_7H_{15} + H_2O$ | H atom abstraction |
| $n\text{-}C_7H_{15} + O_2 => n\text{-}C_7H_{15}OO$ | Oxygen addition |
| $n\text{-}C_7H_{15}OO => n\text{-}C_7H_{14}OOH$ | Internal H atom abstraction |
| $n\text{-}C_7H_{14}OOH + O_2 => OOC_7H_{14}OOH$ | Oxygen addition |
| $OOC_7H_{14}OOH => HOOC_7H_{13}OOH$ | Internal H atom abstraction |
| $HOOC_7H_{13}OOH => HOOC_7H_{13}O + OH$ | Chain branching |
| $HOOC_7H_{13}O => OC_7H_{13}O + OH$ | Chain branching |
| $n\text{-}C_7H_{15} + O_2 => C_7H_{14} + HO_2$ | Chain termination |

Table 2 below depicts some of the chemical reactions involved in intermediate- and high-temperature oxidation of n-heptane, where hydrogen peroxide decomposition is the main route to yielding OH. It is understood that RH refers to any of a number of different hydrocarbon molecules having an H atom attached to a carbon atom, and R refers to the corresponding hydrocarbon molecule with the H atom no longer attached.

TABLE 2

Figure 15:
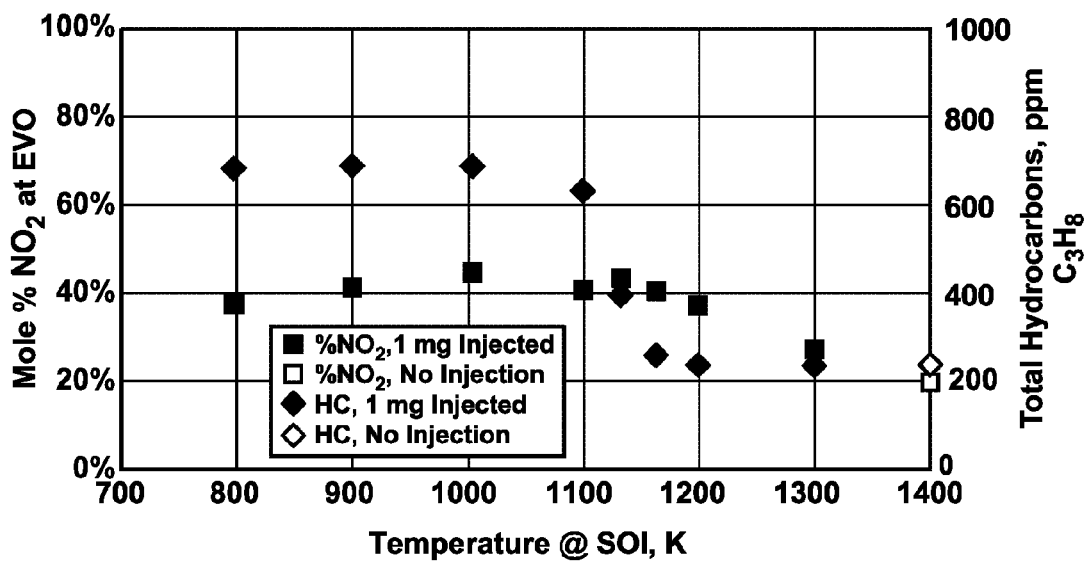
FIG. 15 graphically illustrates an injected fuel mass during various start of injection crank angles according to temperature into only the second of seven modeling zones of a modeled combustion event and resulting percentage of $NO_2$ in NOx and total hydrocarbons present in an exhaust gas feedstream, in accordance with the present disclosure.

$H_2O_2 + M => OH + OH + M$
$n\text{-}C_7H_{16} + OH => C_7H_{15} + H_2O$
$C_7H_{15} => 1\text{-}C_4H_9 + C_3H_6$
$1\text{-}C_4H_9 => C_2H_5 + C_2H_4$
$C_2H_4 + OH => C_2H_3 + H_2O$
$C_3H_6 + OH => C_3H_5 + H_2O$
$C_3H_5 + HO_2 => C_3H_5O + OH$
$C_3H_5O => C_2H_3 + CH_2O$
$C_2H_3 + O_2 => CH_2O + HCO$
$HCO + M => CO + H + M$
$H + O_2 + M => HO_2 + M$
$C_7H_{15} + O_2 => C_7H_{14} + HO_2$
$HO_2 + RH => H_2O_2 + R$ FIG. 15 graphically depicts hydrocarbon emissions and percentage of $NO_2$ at EVO when fuel is injected only into the second of seven model zones. A 1.0 mg injected fuel mass is injected into the second zone of the HCCI combustion model of the exemplary engine model at various SOI locations according to temperature and the resulting percentage of NOx present as $NO_2$ and the total hydrocarbons at NVO, in accordance with the present disclosure. This model calculation represents an extreme case of the non-uniform fuel distribution that results when a real fuel injector is used for fuel injection during the expansion stroke. A real fuel injector will not necessarily inject fuel uniformly into all zones, as has been assumed in the modeling results presented in FIGS. 5-14. The axis of abscissa represents the temperature at the SOI location (Temperature @ SOI, K) and the axis of ordinate represents the $NO_2$ percentage at EVO (Mole % $NO_2$ at EVO) and the total hydrocarbons (Total Hydrocarbons, ppm). It is appreciated that total hydrocarbons present at NVO, and therefore present in the exhaust gas feedstream, are highest when the $NO_2$ percentage at EVO is at a maximum. It is also appreciated that the $NO_2$ percentage is less when 1 mg of fuel is injected into only one of the seven model zones, as shown in FIG. 15, compared to when 1 mg of fuel is injected into all six of the main model combustion zones, as shown in FIG. 6.

Figure 16:
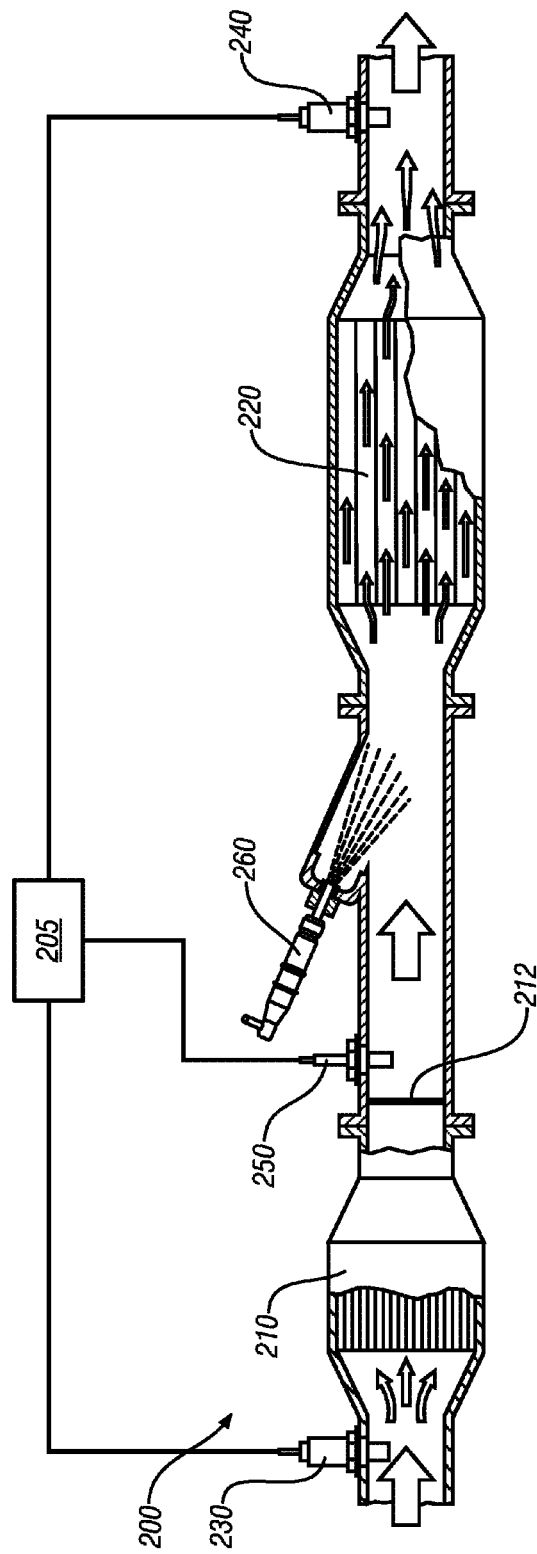
FIG. 16 schematically illustrates an exemplary aftertreatment system including a first aftertreatment device and a second aftertreatment device, in accordance with the present disclosure.

FIG. 16 schematically illustrates an exemplary aftertreatment system 200 including a first aftertreatment device 210, a second aftertreatment device 220 and an aftertreatment control module 205, wherein the aftertreatment control module 205 includes programming required to process inputs related to the aftertreatment system 200 and can include programming to employ methods described herein. It is understood that the aftertreatment control module 205 has supervisory control over the aftertreatment system 200 and is in communication with the engine control module 5. Depending upon system requirements, the aftertreatment system 200 can further include, but does not necessarily include, a NOx trap 212, an upstream NOx sensor 230, a downstream NOx sensor 240, a temperature sensor 250, and a dosing module 260. The dosing module 260 is a urea dosing module if a urea-SCR device is utilized. Additionally, the dosing module 260 can be configured as a hydrocarbon dosing module if a hydrocarbon-SCR device is utilized. Urea and hydrocarbon dosing modules are known in the art and will not be discussed in detail herein. Temperature sensor 250 is depicted, located in a region to gather exhaust gas flow temperatures within the aftertreatment system 200.

Embodiments envisioned include the first aftertreatment device 210 configured as a NOx treatment catalyst. The NOx treatment catalyst can be configured as a three-way catalyst (TWC) device. A TWC performs a number of catalytic functions necessary to aftertreatment of an exhaust gas feedstream. The TWC is utilized particularly in gasoline applications. In association with the first aftertreatment device 210 configured as a TWC device, the NOx trap 212 utilizes catalysts capable of storing some amount of NOx. It will be appreciated that although NOx trap 212 is illustrated downstream of the TWC device (i.e., first aftertreatment device 212), the NOx trap 212 could additionally be attached directly to the TWC device, or positioned upstream of the TWC device. It is further appreciated that the NOx treatment catalyst can be configured as a diesel oxidation catalyst (DOC) device, wherein DOC devices are utilized particularly in diesel applications.

One exemplary method includes using a lean NOx trap 212 to store NOx emissions during fuel lean operations and then purging the stored NOx during fuel rich, higher temperature engine operating conditions with conventional three-way catalysis to nitrogen and water. However, use of a NOx trap to store NOx during cold start operation, when the temperature is low, limits NOx storage to $NO_2$ until the TWC device (i.e., first aftertreatment device 210) is warmed up. Additionally, during hot start operations, known methods include starting with rich fueling in order to achieve stoichiometric conditions over the TWC device such that NOx stored by the NOx trap 212 can be reduced to $N_2$. However, it is appreciated that it can be difficult to control air-fuel ratios in the exhaust gas feedstream using engine fueling during the starting period.

In an exemplary embodiment of the present disclosure, the NOx trap 212 is utilized to store NOx during periods of cold start operation while operating the engine 10 lean of stoichiometry. It is appreciated that the TWC device (i.e., first aftertreatment device 210) is not warmed up during periods of cold start operation, wherein the warm-up period can last 10 to 20 seconds, or even longer for diesel engine applications. Therefore, NO and $NO_2$ contained in the exhaust gas feedstream passes through the TWC device (i.e., first aftertreatment device 210) without being reduced to $N_2$. Additionally, a majority of the NOx present within the exhaust gas feedstream consists of NO, which cannot be stored on the NOx trap 212 storage material. Due to low operating temperatures where an oxidation catalyst in the TWC device is not warmed up, NO cannot be oxidized to $NO_2$, and therefore, NOx cannot be stored on the NOx trap 212 storage material. It is therefore desirable to have a ratio of $NO_2$ to NO of substantially all $NO_2$ within the exhaust gas feedstream in order to store $NO_2$ on the NOx trap 212 storage material. Utilizing the exemplary $NO_2$ generation cycle, the ratio of $NO_2$ to NO can be increased to substantially all $NO_2$ by injecting a small amount of fuel into to the cylinder after the primary combustion event during the expansion stroke, and thus, $NO_2$ can be stored on the NOx trap 212 storage material during the warm-up period (i.e., during cold start operation) and during periods of engine operation lean of stoichiometry. After the warm-up period, the NOx trap 212 can be regenerated by purging the stored NOx during fuel rich, higher temperature engine operating conditions with conventional three-way catalysis to nitrogen and water.

In another exemplary embodiment of the present disclosure, the NOx trap 212 is utilized to store NOx during periods of hot start operation while operating the engine 10 lean of stoichiometry. It is appreciated that the TWC device (i.e., first aftertreatment device 210) generally contains stored oxygen during hot start operation, wherein known methods start the engine with rich fueling in order to achieve stoichiometric conditions over the TWC device to reduce NOx within the exhaust gas feedstream to $N_2$. However, it is further appreciated that it is difficult to control the air-fuel ratio within the exhaust gas feedstream utilizing engine fueling (i.e., hydrocarbons) during periods of start operation. In the exemplary method, the engine is operated lean of stoichiometry, and the ratio of $NO_2$ to NO is increased in order to efficiently store $NO_2$ present in the NOx where it is appreciated that NO does not efficiently store on the NOx trap 212 storage material. It is therefore desirable to have a ratio of $NO_2$ to NO of substantially all $NO_2$ within the exhaust gas feedstream in order to store $NO_2$ on the lean NOx trap storage material. Utilizing the exemplary $NO_2$ generation cycle, the ratio of $NO_2$ to NO can be increased to substantially all $NO_2$ by injecting a small amount of fuel into to the cylinder after the primary combustion event during the expansion stroke, and thus, $NO_2$ can be stored on the NOx trap 212 storage material during the start up period. After the start up period, the engine operating conditions can resume to stoichiometric operations and the NOx trap 212 can be regenerated.

Embodiments envisioned include the second aftertreatment device 220 configured as a selective catalytic reduction (SCR) device. It is further appreciated that embodiments envisioned can include an SCR device that utilizes urea as a reactant to reduce NOx into $N_2$ and water (hereinafter a urea-SCR device) or an SCR device that utilizes hydrocarbons as a reactant to reduce NOx into $N_2$ and water (hereinafter a hydrocarbon-SCR device). The dosing module 260 is a urea dosing module if the embodiment includes the urea-SCR device. Likewise, the dosing module 260 is a hydrocarbon dosing module if the embodiment includes the hydrocarbon-SCR device. The upstream NOx sensor 230 detects and quantifies NOx in the exhaust gas flow entering the aftertreatment system 200. While upstream NOx sensor 230 is illustrated as an exemplary means to quantify NOx entering the aftertreatment system 200, it should be noted that NOx entering the system can be quantified for use in evaluating conversion efficiency in an SCR device (i.e., second aftertreatment device 220) by other means, for example, through a NOx sensor located between the first (i.e., TWC device) and second after treatment devices 210,220, respectively, or through a virtual NOx sensor modeling engine output and conditions within the exhaust gas feedstream to estimate the presence of NOx entering the aftertreatment system 210.

In an exemplary embodiment, the second aftertreatment device 220 is configured as a urea-SCR device. During periods of lean engine operation and during low operating temperatures, it is known that the desired molar ratio of $NO_2$ to NO for optimal NOx conversion efficiency for a urea-SCR device is one to one. As mentioned above, only one-fourth to one-third of the NOx present in an exhaust gas feedstream is $NO_2$. It is therefore desirable to increase the $NO_2$ to NO molar ratio in the exhaust gas feedstream to one to one for optimal conversion of NOx to $N_2$ and water. Utilizing the exemplary $NO_2$ generation cycle, the ratio of $NO_2$ to NO can be increased to substantially one to one by injecting a small amount of injected fuel mass into to the cylinder after the primary combustion event during the expansion stroke, and thus, the urea-SCR device can efficiently convert NOx to $N_2$ and water (see FIGS. 11 and 12). It should be appreciated that the injected fuel mass into the combustion chamber after the primary combustion event results in the generation of $HO_2$ which aids in oxidizing NO present in the combustion chamber to generate $NO_2$ (see Eq. 1-4). Alternatively, an $NO_2$ generation cycle can include injecting extra fuel mass after the primary combustion event into a plurality of cylinders less than the total number of cylinders in a multi-cylinder engine. This alternative $NO_2$ generation cycle is applicable when the desired exhaust gas feedstream ratio of $NO_2$ to NO is less than substantially all $NO_2$. Therefore, injecting extra fuel mass after the primary combustion event into a plurality of cylinders less than the total number of cylinders can be applied when the second aftertreatment device 220 is configured as the urea-SCR device because the desired molar ratio of $NO_2$ to NO for optimal NOx conversion efficiency for the urea-SCR device is one to one.

In an exemplary embodiment, the second aftertreatment device 220 is configured as a hydrocarbon-SCR device. Hydrocarbon-SCR devices (i.e., second after treatment device 220) can utilize a silver-alumina catalyst system to reduce NOx present in the exhaust gas feedstream to $N_2$ and water. It is appreciated that silver-alumina catalyst systems have a significantly higher $NO_2$ conversion to $N_2$ at low operating temperatures than NO conversion to $N_2$. It is further appreciated that low temperature activity is extremely important in lean-burn gasoline and diesel aftertreatment systems. Therefore, during engine operating conditions lean of stoichiometry and during low operating temperatures, it is desirable to increase the $NO_2$ to NO ratio to substantially all $NO_2$ in the exhaust gas feedstream to increase the conversion efficiency of NOx to $N_2$ and water utilizing a hydrocarbon-SCR device including a silver-alumina catalyst system. Utilizing the exemplary $NO_2$ generation cycle, the ratio of $NO_2$ to NO can be increased to substantially all $NO_2$ by injecting a small amount of fuel into the cylinder after the primary combustion event during the expansion stroke, and thus, the silver-alumina catalyst system can efficiently convert NOx to $N_2$ and water. For example, 1.0 mg of injected fuel mass could be injected into the cylinder during the expansion stroke at or around 38 degrees aTDC (see FIGS. 5 and 6). It should be appreciated that injected fuel mass into the combustion chamber after the primary combustion event results in the generation of $HO_2$ which aids in oxidizing NO present in the combustion chamber to generate $NO_2$ (see Eq. 1-4).

Embodiments envisioned further include the first aftertreatment device 210 configured as a DOC device 210 and the second aftertreatment device 220 configured as a DPF device, wherein the aftertreatment system 200 is a diesel aftertreatment system. Additionally, the second aftertreatment device 220 can include a SCR device in addition to the DPF device. It is known that higher $NO_2$ presence in the exhaust gas feedstream aids in the regeneration of a DPF device (i.e., second after treatment device 220), especially when lean air-fuels are desirable as in diesel engine operation. As mentioned above, it is further appreciated that oxidation catalysts (i.e., first aftertreatment device 210 configured as a DOC) utilized for, inter alia, increasing $NO_2$ presence in the exhaust gas feedstream by oxidizing NO can be ineffective at low temperatures, such as during engine start-up. Therefore, increasing the $NO_2$ to NO ratio to substantially all $NO_2$ is desirable during engine start up due to the ineffectiveness of oxidation catalysts before warming up. Utilizing the exemplary $NO_2$ generation cycle, the ratio of $NO_2$ to NO can be increased to substantially all $NO_2$ by injecting a small amount of fuel into to the cylinder after the primary combustion event during the expansion stroke, and thus, the DPF device (i.e., second aftertreatment device 210) can be efficiently regenerated. It should be appreciated that the injection of fuel mass into the combustion chamber after the primary combustion event results in the generation of $HO_2$ which aids in oxidizing NO present in the combustion chamber to generate $NO_2$ (see Eq. 1-4).

Furthermore, whether the first aftertreatment device 210 is a NOx treatment catalyst configured as a DOC device or a TWC device including oxidation catalysts, the platinum group metals used in the oxidation catalysts can be very expensive. Thus, it would be desirable to limit the loading of the platinum group metals used in the oxidation catalysts. As discussed above, the efficiency and effectiveness of various aftertreatment devices utilized for NOx reduction in an aftertreatment system depend upon a high $NO_2$ to NO ratio in the exhaust gas feedstream. However, decreasing the loading of platinum group metals in the oxidation catalysts would decrease the efficiency and ability of oxidizing NO to $NO_2$ in an exhaust gas feedstream. Therefore, it is desirable to increase the $NO_2$ to NO ratio in an exhaust gas feedstream while limiting the loading of platinum metals utilized in the oxidation catalysts. Utilizing the exemplary $NO_2$ generation cycle, the ratio of $NO_2$ to NO can be increased within the exhaust gas feedstream by injecting a small amount of fuel into to the cylinder after the primary combustion event during the expansion stroke. It should be appreciated that the exemplary $NO_2$ generation cycle can be utilized during cold engine start-up, and additionally, after the engine has warmed up or during hot engine start-up.

The methods described herein contemplate increasing the ratio of $NO_2$ to NO through $NO_2$ generation cycles, utilizing injected fuel mass during the expansion stroke of a combustion event to increase the effectiveness of aftertreatment devices within an aftertreatment system. It will be appreciated that these methods are contemplated with a homogeneous charge compression ignition engine. However, the methods disclosed herein are equally applicable to spark-ignition and compression ignition engines.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Apparatus for reducing NOx emissions in a powertrain comprising an internal combustion engine including a combustion chamber, the apparatus comprising:
   an aftertreatment system; and
   an aftertreatment system control module configured to:
      monitor an actual exhaust gas feedstream ratio of $NO_2$ to NO;
      monitor a desired exhaust gas feedstream ratio of $NO_2$ to NO;
      compare the actual and the desired exhaust gas feedstream ratios of $NO_2$ to NO;
      initiate $NO_2$ generation selectively to increase the actual exhaust gas feedstream ratio of $NO_2$ to NO by injecting a fuel mass into the combustion chamber after a primary combustion event to generate HO2, wherein said generated $HO_2$ oxidizes NO present in the combustion chamber to generate $NO_2$ sufficient to increase the actual exhaust gas feedstream ratio of $NO_2$ to NO at the desired exhaust gas feedstream ratio of $NO_2$ to NO.

2. Method for reducing NOx emissions in a powertrain comprising an internal combustion engine including a combustion chamber and an aftertreatment system, the method comprising:
   monitoring an actual exhaust gas feedstream ratio of $NO_2$ to NO;
   monitoring a desired exhaust gas feedstream ratio of $NO_2$ to NO;
   comparing the actual and the desired exhaust gas feedstream ratios of $NO_2$ to NO; and
   selectively initiating a $NO_2$ generation cycle to increase the actual exhaust gas feedstream ratio of $NO_2$ to NO based upon the comparison of the actual and the desired exhaust gas feedstream ratios of $NO_2$ to NO comprising injecting fuel mass into the combustion chamber after a primary combustion event to generate $HO_2$, wherein said generated $HO_2$ oxidizes NO present in the combustion chamber to generate $NO_2$ sufficient to increase the actual exhaust gas feedstream ratio of $NO_2$ to NO.

3. The method of claim 2, wherein monitoring the desired exhaust gas feedstream ratio of $NO_2$ to NO comprises:
monitoring operation of the engine;
determining a desired engine NOx aftertreatment device based upon the operation of the engine; and
selecting the desired exhaust gas feedstream ratio of $NO_2$ to NO based on the desired engine NOx aftertreatment device.

4. The method of claim 3, wherein determining the desired engine NOx aftertreatment device comprises:
utilizing a NOx treatment catalyst and a lean NOx trap during periods of cold start operation and engine operation lean of stoichiometry;
wherein selecting the desired exhaust gas feedstream ratio of $NO_2$ to NO comprises:
during said periods of cold start operation and engine operation lean of stoichiometry, selecting the desired exhaust gas feedstream ratio of $NO_2$ to NO as substantially all $NO_2$ for storing $NO_2$ on said lean NOx trap.

5. The method of claim 3, wherein determining the desired engine NOx aftertreatment device comprises:
utilizing a urea-selective catalytic reduction device during periods of warm-up of said aftertreatment system and engine operation lean of stoichiometry;
wherein selecting the desired exhaust gas feedstream ratio of $NO_2$ to NO comprises:
during said periods of warm-up of said aftertreatment system and engine operation lean of stoichiometry, selecting the desired exhaust gas feedstream ratio of $NO_2$ to NO to substantially a one to one molar ratio of $NO_2$ to NO.

6. The method of claim 3, wherein the desired engine NOx aftertreatment device comprises an upstream oxidation catalyst including platinum group metals.

7. The method of claim 2 further comprising:
generating $HO_2$ from the injected fuel mass into the combustion chamber after a primary combustion event; and
utilizing the generated $HO_2$ to oxidize NO present in the combustion chamber to generate $NO_2$.

8. Method for reducing NOx emissions in a powertrain comprising an internal combustion engine including a combustion chamber and an aftertreatment system, the method comprising:
monitoring an actual exhaust gas feedstream ratio of $NO_2$ to NO;
monitoring a desired exhaust gas feedstream ratio of $NO_2$ to NO;
comparing the actual and the desired exhaust gas feedstream ratios of $NO_2$ to NO; and
selectively initiating a $NO_2$ generation cycle based upon the comparison of the actual and the desired exhaust gas feedstream ratios of $NO_2$ to NO comprising injecting extra fuel mass after the primary combustion event into a plurality of cylinders less than the total number of cylinders in a multi-cylinder engine when the desired exhaust gas feedstream ratio of $NO_2$ to NO is less than substantially all $NO_2$.

9. Method for reducing NOx emissions in a powertrain comprising an internal combustion engine including a combustion chamber and an aftertreatment system, the method comprising:
monitoring operation of the engine;
determining an actual exhaust gas feedstream ratio of $NO_2$ to NO;
determining a desired engine NOx aftertreatment device based upon the operation of the engine;
selecting a desired exhaust gas feedstream ratio of $NO_2$ to NO based on the desired engine NOx aftertreatment device;
comparing the actual and the desired exhaust gas feedstream ratios of $NO_2$ to NO;
injecting a fuel mass into the combustion chamber after a primary combustion event to generate $HO_2$; and
utilizing the generated $HO_2$ to oxidize NO present in the combustion chamber to generate $NO_2$ sufficient to establish the actual exhaust gas feedstream ratio of $NO_2$ to NO at the desired exhaust gas feedstream ratio of $NO_2$ to NO.

10. The method of claim 9, wherein selecting the desired exhaust gas feedstream ratio of $NO_2$ to NO based on the desired engine NOx aftertreatment device comprises:
during periods of cold start operation and engine operation lean of stoichiometry, selecting the desired exhaust gas feedstream ratio of $NO_2$ to NO as substantially all $NO_2$ for storing $NO_2$ on a lean NOx trap.

11. The method of claim 9, wherein selecting the desired exhaust gas feedstream ratio of $NO_2$ to NO based on the desired engine NOx aftertreatment device comprises:
during periods of hot start operation and engine operation lean of stoichiometry, selecting the desired exhaust gas feedstream ratio of $NO_2$ to NO as substantially all $NO_2$ for storing $NO_2$ on a lean NOx trap.

12. The method of claim 9, wherein selecting the desired exhaust gas feedstream ratio of $NO_2$ to NO based on the desired engine NOx aftertreatment device comprises:
during periods of warm-up of said aftertreatment system and engine operation lean of stoichiometry, selecting the desired exhaust gas feedstream ratio of $NO_2$ to NO as substantially one to one.

13. The method of claim 9, wherein said internal combustion engine is a homogeneous charge compression ignition engine.

14. The method of claim 9, wherein said internal combustion engine is an stratified charge spark-ignition engine.

15. The method of claim 9, wherein said internal combustion engine is a homogenous spark-ignition engine.

16. The method of claim 9, wherein said internal combustion engine is a diesel engine.

17. Method for reducing NOx emissions in a powertrain comprising an internal combustion engine including a combustion chamber and an aftertreatment system, the method comprising:
monitoring an actual exhaust gas feedstream ratio of $NO_2$ to NO;
monitoring a desired exhaust gas feedstream ratio of $NO_2$ to NO, comprising:
monitoring operation of the engine;
determining a desired engine NOx aftertreatment device based upon the operation of the engine, comprising:
utilizing a NOx treatment catalyst and a lean NOx trap during periods of hot start operation and engine operation lean of stoichiometry;
wherein selecting the desired exhaust gas feedstream ratio of $NO_2$ to NO comprises:
during said periods of hot start operation and engine operation lean of stoichiometry, selecting the desired exhaust gas feedstream ratio of $NO_2$ to NO as substantially all $NO_2$ for storing $NO_2$ on said lean NOx trap;
selecting the desired exhaust gas feedstream ratio of NO, to NO based on the desired engine NOx aftertreatment device:
comparing the actual and the desired exhaust gas feedstream ratios of $NO_2$ to NO; and
selectively initiating a $NO_2$ generation cycle based upon the comparison of the actual and the desired exhaust gas feedstream ratios of $NO_2$ to NO comprising injecting fuel mass into the combustion chamber after a primary combustion event.

18. Method for reducing NOx emissions in a powertrain comprising an internal combustion engine including a combustion chamber and an aftertreatment system, the method comprising:
monitoring an actual exhaust gas feedstream ratio of $NO_2$ to NO;
monitoring a desired exhaust gas feedstream ratio of $NO_2$ to NO, comprising:
monitoring operation of the engine:
determining a desired engine NOx aftertreatment device based upon the operation of the engine, comprising:
utilizing a hydrocarbon-selective catalytic reduction device during periods of warm-up of said aftertreatment system and engine operation lean of stoichiometry;
wherein selecting the desired exhaust gas feedstream ratio of $NO_2$ to NO comprises:
during periods of warm-up of said aftertreatment system and engine operation lean of stoichiometry, selecting the desired exhaust gas feedstream ratio of $NO_2$ to NO as substantially all $NO_2$;
selecting the desired exhaust gas feedstream ratio of $NO_2$ to NO based on the desired engine NOx aftertreatment device;
comparing the actual and the desired exhaust gas feedstream ratios of $NO_2$ to NO; and
selectively initiating a $NO_2$ generation cycle based upon the comparison of the actual and the desired exhaust gas feedstream ratios of $NO_2$ to NO comprising injecting fuel mass into the combustion chamber after a primary combustion event.

19. The method of claim 18, wherein said hydrocarbon-selective catalytic reduction system comprises a silver-alumina catalyst.

20. Method for reducing NOx emissions in a powertrain comprising an internal combustion engine including a combustion chamber and an aftertreatment system, the method comprising:
monitoring an actual exhaust gas feedstream ratio of $NO_2$ to NO;
monitoring a desired exhaust gas feedstream ratio of $NO_2$ to NO, comprising:
monitoring operation of the engine;
determining a desired engine NOx aftertreatment device based upon the operation of the engine, comprising:
utilizing a diesel particulate filter and an oxidation catalyst upstream of said diesel particulate filter;
wherein selecting the desired exhaust gas feedstream ratio of $NO_2$ to NO comprises:
selecting the desired exhaust gas feedstream ratio of $NO_2$ to NO as substantially all $NO_2$ during warm-up of said aftertreatment device;
selecting the desired exhaust gas feedstream ratio of $NO_2$ to NO based on the desired engine NOx aftertreatment device;
comparing the actual and the desired exhaust gas feedstream ratios of $NO_2$ to NO; and
selectively initiating a $NO_2$ generation cycle based upon the comparison of the actual and the desired exhaust gas feedstream ratios of $NO_2$ to NO comprising injecting fuel mass into the combustion chamber after a primary combustion event.

21. The method of claim 20, wherein selecting the desired exhaust gas feedstream ratio of $NO_2$ to NO to substantially all $NO_2$ during periods of warm-up of said aftertreatment device further comprises selecting the desired exhaust gas feedstream ratio of $NO_2$ to NO as substantially all $NO_2$ after warm-up of said aftertreatment device.

* * * * *